K. CWIRKO.
DISH WASHING MACHINE.
APPLICATION FILED DEC. 30, 1919.
1,381,107.
Patented June 14, 1921.
2 SHEETS—SHEET 1.
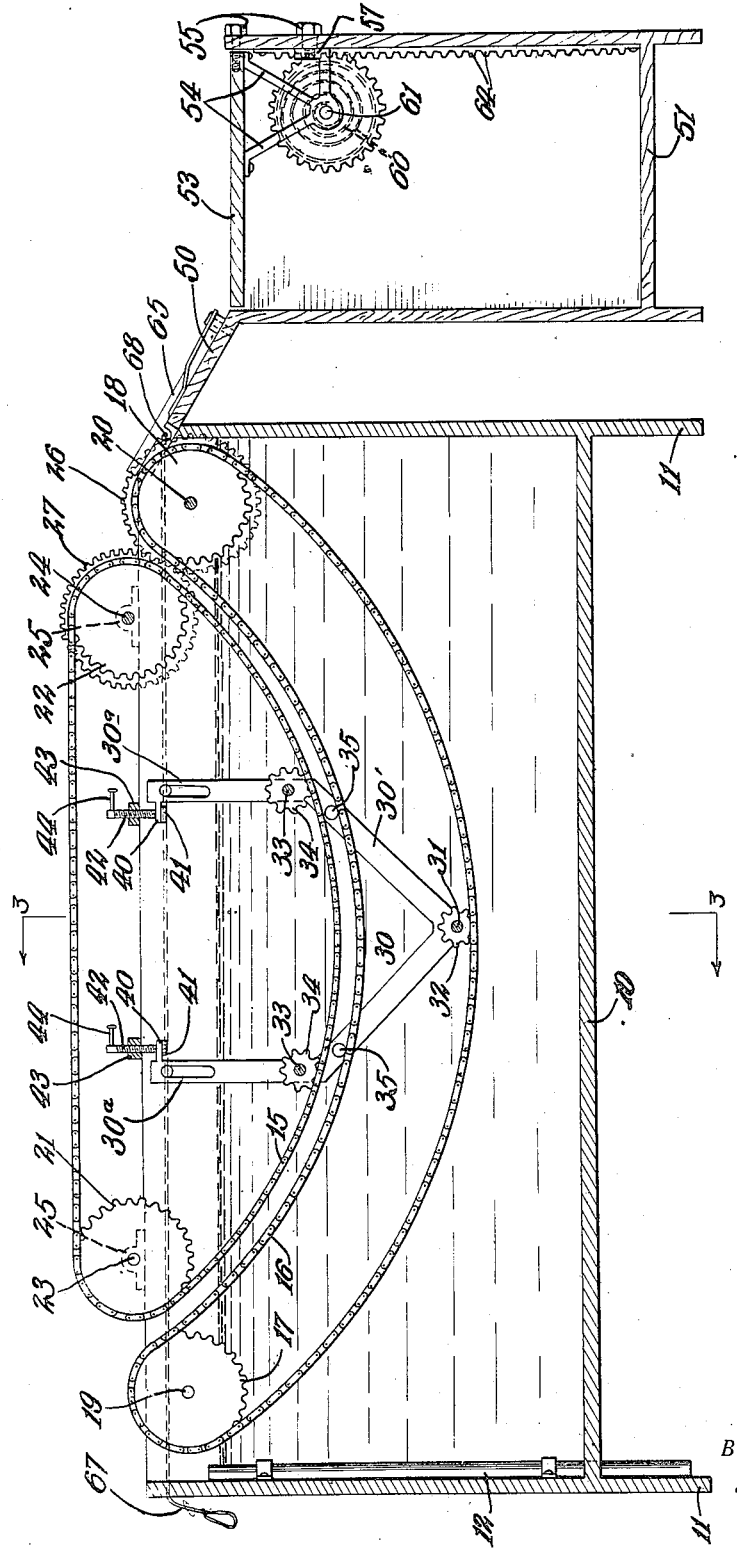
INVENTOR.
Kazimir Cwirko
BY
George C. Heinicke
ATTORNEY.

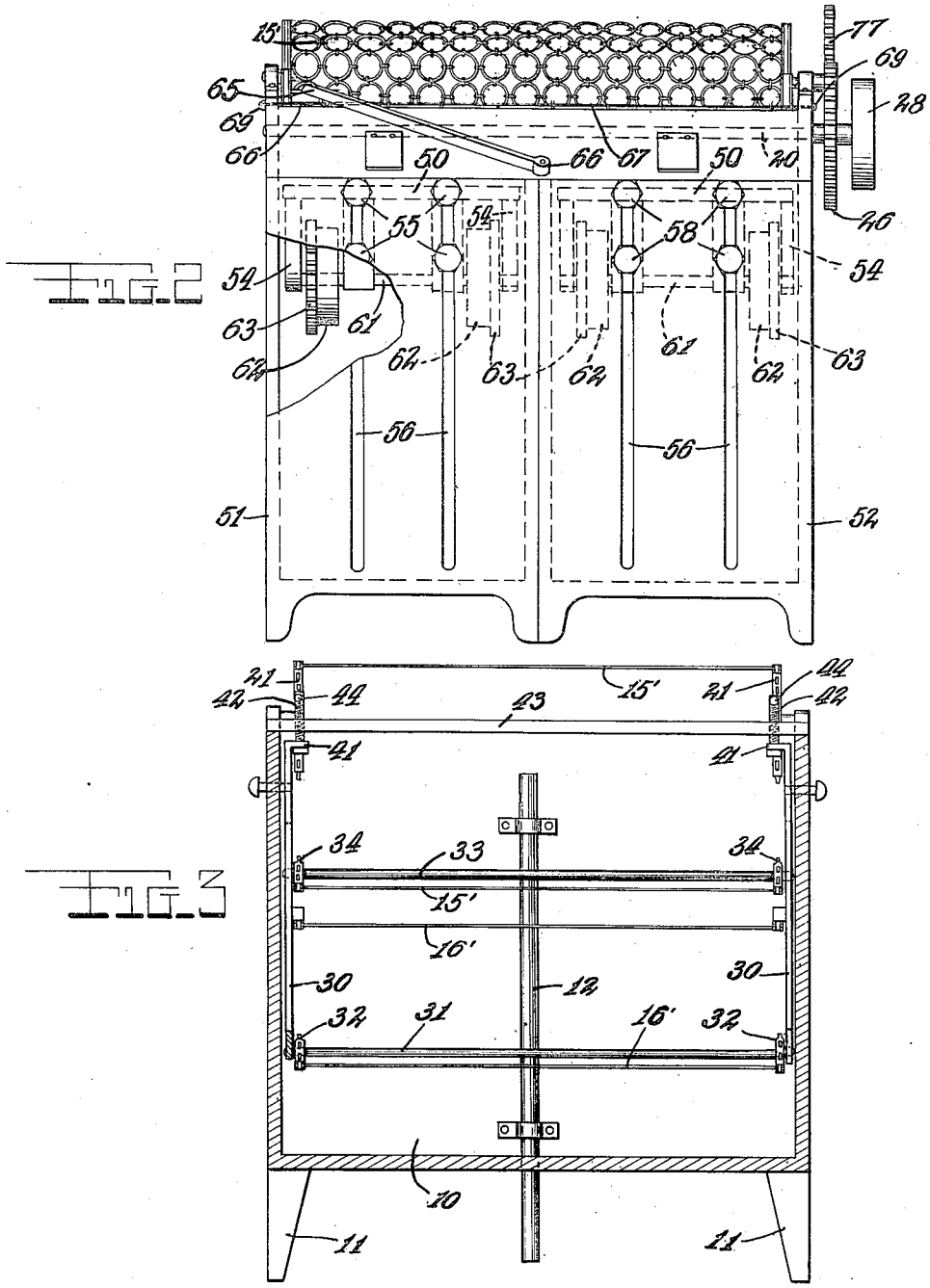

UNITED STATES PATENT OFFICE.

KAZIMIR CWIRKO, OF NEW YORK, N. Y.

DISH-WASHING MACHINE.

1,381,107.  Specification of Letters Patent.  Patented June 14, 1921.

Application filed December 30, 1919. Serial No. 348,327.

*To all whom it may concern:*

Be it known that I, KAZIMIR CWIRKO, a citizen of Poland, residing at New York, county of New York, and State of New York, have invented certain new and useful Improvements in Dish-Washing Machines, of which the following is a specification.

This invention relates to a dishwashing machine and it has for an object to provide a simple and compact form of dishwashing machine characterized by ease and speed of operation.

A further object is to provide a duplex receiving device either element of which may operate while the other is being emptied.

For further comprehension of the invention, and of the objects and advantages thereof, reference will be had to the following description and accompanying drawings, and to the appended claims in which the various novel features of the invention are more particularly set forth.

Figure 1 of the drawings is a longitudinal sectional view of a dishwashing machine constructed according to my invention.

Fig. 2 is a rear view thereof.

Fig. 3 is a transverse section on the line 3—3 of Fig. 1.

As here shown my improved dishwashing machine comprises an elongated rectangular tank 10 supported at its corners on legs 11, and adapted to be filled almost to the top with water, as indicated in Fig. 1. The water is preferably heated, with a suitable cleaning medium dissolved in it. An overflow pipe 12, which may connect with a suitable drain, extends upwardly in the tank.

The dishes to be washed are conveyed through the water by a pair of endless conveyers 15 and 16 arranged one above the other with the lower reach of the upper conveyer resting within the upper reach of the lower conveyer. These conveyers preferably each consists of a pair of sprocket chains united by wire mesh 15' and 16'. The lower conveyer 16 is mounted on sprocket wheels such as 17 and 18 at opposite ends of the tank which are fixed on shafts 19 and 20 journaled in the side walls of the tank and extending transversely through the latter. The upper conveyer 15 is somewhat shorter than the lower conveyer 16, being looped over sprocket wheels such as 21 and 22 spaced inwardly from the ends of the tank a greater distance than the sprocket wheels 17 and 18 and on a slightly higher level than the latter, being here shown as fixed on shafts 23 and 24 journaled in bearings 25 on the tops of the side walls of the tank. The conveyers are driven in unison by meshing gears 26 and 27 on the ends of shafts 20 and 24, the shaft 20 having also fixed thereon a pulley 28 to receive a driving belt.

The conveyers are both mounted on their sprocket wheels with considerable slack so as to cause them to sag or depend into the water as shown. Both reaches of the lower conveyer depend into the water while the lower reach only of the upper conveyer depends thereinto, the two conveyers being arranged so that the lower reach of the upper conveyer extends substantially parallel to the upper reach of the lower conveyer, these two reaches being spaced apart a suitable distance to accomodate the dishes to be washed therebetween.

To hold the conveyers in proper position a pair of saddle-like frames 30 are supported in the tank adjacent opposite sides thereof and midway between its ends. Each of these frames comprising a bar bent midway between its ends presents a lower V-shaped portion 30' and upper vertical portions 30$^a$. Journaled in the bottom of the V-shaped portion is a shaft 31 upon which is fixed a pair of sprocket wheels 32 adapted to engage the upper side of the lower reach of the conveyer 16. A similar pair of shafts 33 are journaled in the lower ends of the vertical portions 30$^a$ and have fixed thereto sprocket wheels 34 adapted to engage the upper side of the lower conveyer. Secured in the frames 30 a short distance below the shafts 33 are pins 35 which project between the edges of the upper and lower conveyer and serve to hold the latter properly spaced apart.

The frames are adjustable vertically in the tank, being here shown as provided with lateral lugs 40 on their upper ends which rest upon the heads 41 of screws 42 passing freely upward through suitable apertures in the lugs and threaded through cross bars 43 supported on the side walls of the tank, these screws 42 having handles 44 on their upper ends whereby they may be turned.

The cleaned dishes are discharged from the conveyer into a receptacle located adjacent the discharge end of the tank, the top of this receptacle being lower than the top of the rear sprocket wheel 18 of the lower conveyer. An inclined chute 50 leads from the conveyer to the receptacle.

The receptacle is preferably divided along the median line of the machine into two cabinets 51 and 52 which may be constructed as separate units or as a single unit as desired. Each of these cabinets is provided with a vertical movable shelf or flooring 53 which is fixed on a bracket 54 and maintained in its horizontal position by means of upper and lower headed screws 55 passing through vertical slots 56 in the rear wall of the cabinet and secured respectively in the edge of the shelf and in an upturned guide foot 57 on the bracket 54.

Each of the shelves is normally urged to its top position, which is that shown, by means of a pair of clock-springs 60 each connected at one end to a shaft 61 fixed in the brackets 54 and at its opposite end to drums 62 rigid with gears 63 meshing with a pair of rack bars, such as 64, extending vertically within the cabinet and fixed to the front wall thereof. The springs 60 are of just sufficient strength to raise the shelves when empty, the shelves beginning to move downward under the weight of the first dishes discharged thereon.

To enable the dishes to be fed at will to either of the cabinets so as to permit of continued operation of the machine while the contents of one cabinet are being removed, a baffle arm 65 is hinged as at 66 to the chute 50, adjacent the lower end thereof and midway between opposite sides of the machine, this baffle arm extending upwardly over the chute and being adapted to be swung from side to side so as to direct the dishes to one compartment or the other. As here shown adjustment of the baffle bar is effected by a pair of cords 66 and 67 which connect to an eye 68 thereon and lead transversely through suitable apertures in the side of the tank and then forwardly to the receiving end of the machine, being supported by suitable means such as the staples 69.

Having thus described my invention what I claim as new and desire to secure by Letters Patent of the United States is as follows—

1. A dishwashing machine comprising a tank, a traveling conveyer extending through said tank, and means for causing the dishes passing from the said conveyer to be delivered, said means including a chute, and a baffle bar pivoted to said chute midway between opposite sides of the machine.

2. A dishwashing machine comprising a tank, a traveling conveyer extending through said tank, and means for causing the dishes passing from the said conveyer to be delivered, said means including a chute, and a baffle bar pivoted to said chute midway between opposite sides of the machine, and means for adjusting said baffle bar from the receiving end of the tank.

3. A dish washing machine comprising a tank, a traveling conveyer extending through said tank, a delivery chute for the cleaned dishes discharged from said conveyer, a baffle arm hinged to said chute near the lower end thereof, said baffle arm extending upwardly over said chute, and adapted to be swung from side to side, a pair of cords or cables connected to said baffle arm, and means for guiding said cords transversely through said tank for allowing an adjustment of said baffle arm from the receiving end of the tank.

In testimony whereof I have affixed my signature.

KAZIMIR CWIRKO.